E. C. THOMPSON.
Photographic-Studio.
No. 210,645. Patented Dec. 10, 1878.
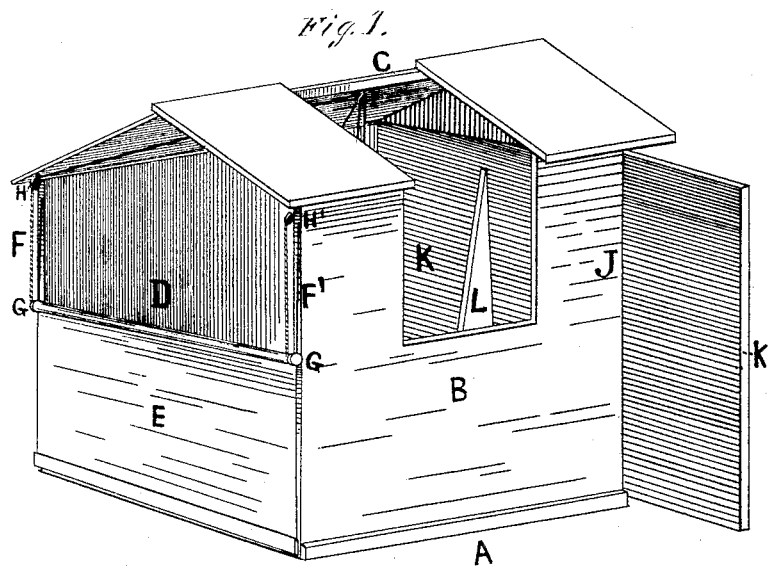
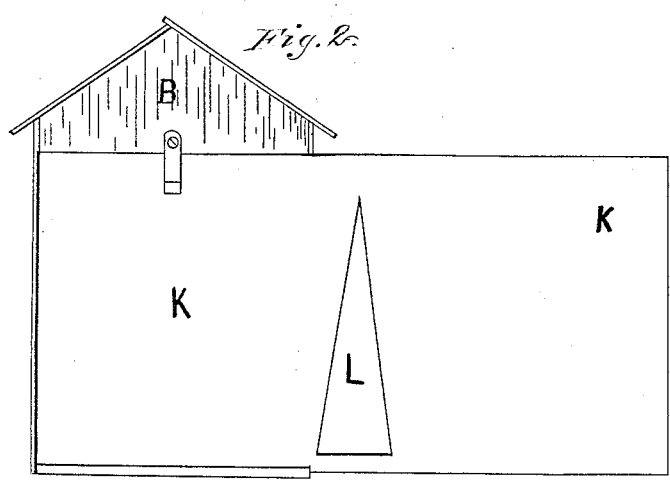
Witnesses:
H. S. Talbot
Edward Edmunds
Inventor:
Edwin C. Thompson,
By Sylvanus Walker
Atty

UNITED STATES PATENT OFFICE.

EDWIN C. THOMPSON, OF WILLIAMSBURG, NEW YORK.

IMPROVEMENT IN PHOTOGRAPHIC STUDIOS.

Specification forming part of Letters Patent No. 210,645, dated December 10, 1878; application filed June 28, 1878.

*To all whom it may concern:*

Be it known that I, EDWIN C. THOMPSON, of Williamsburg, in the county of Kings and State of New York, have invented certain new and useful Improvements in Photograph-Galleries, of which the following is a specification:

The object of my invention is to provide a photographic studio or gallery with means of opening and closing one or both ends of the gallery, so as to enable the operator to take upon the prepared negative a landscape or view of scenery desired as a background from nature—as Niagara Falls—and a good picture of the sitter or group of persons.

Heretofore, in taking pictures of this class, it has been impossible to obtain a good or first-class picture, as the sky and water-fall, or other scenery from nature, would require only three seconds exposure for the best result, whereas the subject or sitter for a good picture would require ten seconds time.

This feature is fully secured by my invention, which consists in providing a gallery or photograph studio with a large opening in one or both ends, so as to permit a view of the desired landscape, water-fall, or scenery at the back of the subject or sitter to be so exposed the desired length of time, and then shut out from view by the operator, so as to allow the negative a further exposure to the subject or sitter, in order to obtain a picture, when printed from the negative in the usual manner, that shall be fine in outline, or the background scenery from nature, and the likeness and drapery of the sitter in all the desired effects of light and shade to give the best results, as hereinafter more fully described and set forth.

Figure 1 is a perspective view of my invention. Fig. 2 is a plan view of one end of the same.

A represents a base or foundation for the gallery. This foundation may be constructed with wheels, so as to allow the same to be moved as desired to obtain the best view and permit of transportation.

B represents the house or gallery, provided with suitable ground-glass skylight C, as heretofore.

A large opening, D, is provided in one end of the gallery, extending its entire width, and is closed more or less, as desired, by a drop or rolling curtain, E, provided with cords F F' at each end, which are secured to the top portion of the opening D at each corner, and pass downward and once about or around the ends of the curtain-roller G, thence upward again to near the point of commencement over pulleys H H', and thence over pulleys I I', leaving their ends suspended near the position of the operator at the camera, so as to permit him to raise the curtain E (which should be black) in rear of the sitter at the desired moment to shut from view the landscape or scenery previously exposed to the negative, and finish the sitting or exposure of the negative at the right time, as heretofore.

In order to take a scenery or background picture of the sky and a water-fall with a good picture of the sitter in the foreground, I construct an open end, J, in the gallery, and provide a sliding door or screen, K, which fits in a suitable groove at bottom and top, and is provided with a vertical slot, L, wider at its base than top, or in a triangular form, as shown, by means of which I am enabled to control the exposure or light, as desired, this opening or slot L being slid transversely in the rear of the subject or sitter, so as to allow more time for the darker portions of the view—such as the banks of the stream—the movement of the slide K and slot L being accelerated or retarded in its passage accordingly, and entirely closed at the instant desired, so as to allow the picture or likeness of the one sitting to be brought out on the negative by the necessary further time of exposure, without injuring the landscape background previously fixed upon the negative, or which required a shorter exposure.

Instead of the slide K, a curtain may be arranged to roll and unroll on and from two rollers placed vertically at each corner of the gallery end J, said curtain being provided with a vertical slot as in the slide, and thus accomplish the same result.

Having thus described my invention, what I claim is—

1. In combination with the photographic studio or gallery B, provided with a skylight, C, and having an open end, D, the curtain E, roller G, and adjusting-cords F F', all being constructed and arranged to operate as and for the purposes set forth.

2. In combination with the photographic studio or gallery B, provided with a skylight, C, and having open ends D or J, the sliding door K, having the vertical slot L, as and for the purposes set forth.

EDWIN C. THOMPSON.

Witnesses:
SYLVENUS WALKER,
A. N. SOUTHWICK.